United States Patent
Paladini et al.

(10) Patent No.: US 7,659,315 B2
(45) Date of Patent: Feb. 9, 2010

(54) USE OF POLYAMINOMETHYLENEPHOSPHONATES AS DISPERSING AGENTS

(75) Inventors: Massimo Paladini, Bergamo (IT); Francesco Spini, Bergamo (IT); Alessandro Scalvedi, Almé (IT); Maurizio Bellotto, Milan (IT); Jean Claude Valle, Bergamo (IT)

(73) Assignee: Giovanni Bozzetto S.p.A., Filago (BG) (IT)

( * ) Notice: Subject to any disclaimer, the term of this patent is extended or adjusted under 35 U.S.C. 154(b) by 558 days.

(21) Appl. No.: 10/597,665

(22) PCT Filed: Jan. 28, 2005

(86) PCT No.: PCT/IT2005/000043
§ 371 (c)(1),
(2), (4) Date: Sep. 15, 2006

(87) PCT Pub. No.: WO2005/073130
PCT Pub. Date: Aug. 11, 2005

(65) Prior Publication Data
US 2008/0161222 A1   Jul. 3, 2008

(30) Foreign Application Priority Data
Feb. 2, 2004   (IT)   .......................... MI2004A0162

(51) Int. Cl.
*B01F 3/12* (2006.01)
*C04B 33/00* (2006.01)
*B01F 17/14* (2006.01)
*C09K 3/00* (2006.01)

(52) U.S. Cl. .......................... 516/79; 516/78; 501/142; 501/148

(58) Field of Classification Search .................... 516/79, 516/78; 106/600, 608, 613, 630, 690, 727; 501/141, 142, 148
See application file for complete search history.

(56) References Cited

U.S. PATENT DOCUMENTS

| | | | |
|---|---|---|---|
| 4,202,871 A * | 5/1980 | Matsumoto et al. ......... | 423/632 |
| 4,304,762 A | 12/1981 | Leigh | |
| 4,468,252 A * | 8/1984 | Crump et al. ............... | 106/717 |
| 4,614,646 A | 9/1986 | Christiansen | |
| 4,945,030 A * | 7/1990 | Turner et al. ................. | 430/331 |
| 5,057,228 A * | 10/1991 | Breen et al. .................. | 210/700 |
| 5,118,436 A | 6/1992 | Aoyagi et al. | |
| 5,567,236 A | 10/1996 | Schapira et al. | |
| 6,616,755 B1 * | 9/2003 | Levy et al. ................... | 106/808 |
| 7,087,781 B2 * | 8/2006 | Paladini et al. ................ | 562/14 |
| 2005/0171376 A1 | 8/2005 | Paladini et al. | |

FOREIGN PATENT DOCUMENTS

| EP | 0 725 044 A1 * | 8/1996 |
|---|---|---|
| EP | 0 997 523 A | 5/2000 |
| WO | WO 96/02624 A | 2/1996 |
| WO | WO 2004/011475 A1 * | 2/2004 |
| WO | WO 01/79215 A | 10/2005 |

OTHER PUBLICATIONS

Priority Document MI2004A000162 (filed Feb. 2, 2004), online @ http://www.wipo.int/pctdb/cgi/guest/search5, (downloaded May 18, 2009), pages Cover, Title, 1-4, & 1-30.*
Derwent Abstract on East, week 200345, London: Derwent Publications Ltd., AN 2000-320163, Class E11, EP 997523 A, (Cht Beitlich GMBH), abstract.*

* cited by examiner

Primary Examiner—Daniel S Metzmaier
(74) Attorney, Agent, or Firm—Themis Law

(57) ABSTRACT

A method of use of polyaminomethylenephosphonates as dispersing, wetting, and/or stabilizing agents in formulations for cements, detergents, ceramic materials, dyes, synthetic resins, rubbers, drilling fluids, and for reverse osmosis includes the step of adding a polyaminomethylenephosphonate having the formula:

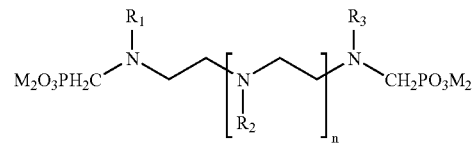

wherein n is an integer higher than 2, M is an alkaline metal or the ammonium ion, and R is: —CH$_2$PO$_3$M$_2$; —CH$_2$Z, wherein Z is —CH$_2$OH, —CHOHCH$_3$, —CHOHCH$_2$Cl, or —CHOHCH$_2$OH; —(CH$_2$)$_m$SO$_3$M, m being 3 or 4; —CH$_2$CH$_2$T, wherein T is —CONH$_2$, —CONH$_2$, —CHO, —COOQ, —COOX, CN, wherein Q is —CH$^3$ or —C$_2$H$_5$ and X is an alkaline metal ion or the ammonium ion; and wherein the polyaminomethylenephosphonate is present in a weight quantity of over 0.01% with respect to the total weight of the formulation.

4 Claims, No Drawings

USE OF POLYAMINOMETHYLENEPHOSPHONATES AS DISPERSING AGENTS

The present invention relates to the use of polyaminomethylenephosphonates (PAF) as agents included in formulations for cements, detergents, paints and varnishes, ceramic materials and other materials, in substitution of and/or in combination with compounds normally adopted for the purpose, with surprisingly enhancing effects, during use, also in the case of co-presence, with respect to the compositions currently on the market.

Phosphonates deriving from phosphorous acid, characterized by the presence of the C—P bond, are known as chelating agents and used as descaling agents, for example in cooling circuits: the chelating effect originates from the formation of soluble phosphonate-metal complexes, which reduces the activity, in solution, of the metal ions; phosphonates also exert a threshold effect, in the sense that they are active as scale-inhibitors at sub-stoichiometric quantities.

Between the threshold effect region and the region of the stoichiometric formation of the complex, however, there is a "turbidity zone" in which the phosphonate is no longer active and, on the contrary, solid precipitates of metal salts of the same phosphonates are formed.

The use of polyaminomethylenephosphonates (PAF) according to what is specified above, in the terms of the present invention, is effected without the formation of any turbidity zone, whatever the product concentration and whatever the composition may be, in which the PAF is used according to the present invention.

Without claiming to explain the action mechanism which is at the basis of the use of the compounds according to the present invention, and, therefore, without being limited by the following considerations, the Applicant is of the opinion that the behaviour of PAF in the use according to the present invention should be attributed to an increase in the solvent power of the molecule with respect to the medium. It is thought that this is due to the increase in the molecular weight of the products and to the presence of groups which have an affinity with the solvent. The behaviour of the polymeric molecules in question therefore envisages

- good chelating efficiency
- presence of threshold effect
- absence of turbidity zone
- excellent inhibition of the crystalline nucleation
- excellent dispersing power
- inhibition properties of corrosion of the metal surfaces.

An object of the present invention therefore relates to the use of polyaminomethylenephosphonates (PAF) according to formula 1 indicated hereunder, for the formulation of compositions for cements, ceramic materials, detergents, paints and varnishes and other compositions, in which they act as dispersing/wetting agents, as substituents and/or in addition to the products currently used for the purpose.

The polyaminomethylenephosphonates (PAF) used in accordance with the present invention have the general formula

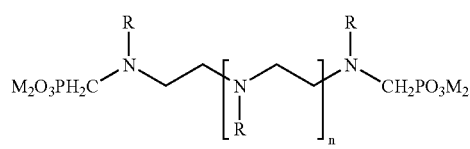

wherein n is an integer higher than 2, M is hydrogen or a cation selected from those of alkaline metals and the ammonium ion, and the residues R, the same or different, are independently selected from 1. $-CH_2PO_3M_2$ with M hydrogen or a cation selected from those mentioned above;
2. $-CH_2R^1$ with $R^1$ selected from $-CH_2OH$, $CHOHCH_3$, $-CHOHCH_2Cl$, $-CHOHCH_2OH$;
3. $-(CH_2)_mSO_3M$, m being equal to 3 or 4, and M having the same previous meanings;
4. $-CH_2CH_2R^2$ with $R^2$ equal to $-CONH_2$, $-CHO$, $-COOR^3$, $-COOX$, $CN$, $R^3$ being either $-CH_3$ or $-C_2H_5$ and X is a cation having the same meanings as M, with the further conditions that at least one of the residues R is different from the methylenephosphonate group, i.e. different from $-CH_2PO_3M_2$.

The compounds according to formula (1) can be prepared with organic synthesis methods known to experts in the field, or according to the procedure described in the co-pending Italian patent application nr. MI02A001706 filed on 31 Mar. 2002 in the name of the same Applicant, wherein the parts of interest are referred to herein as the background of the object according to the present invention.

The chemical stability of these compounds is extremely high, on the same level or even higher than that of traditional phosphonates; their hydrolytic stability in an aqueous environment is considerable under any pH condition, from values of extreme acidity (<1) to those which are highly caustic (>13). All the properties, moreover, can be regulated through suitable modifications in the molecular structure, these properties varying between those of traditional phosphonates and those of traditional dispersing agents (for example polycarboxylic acids) with the advantage, with respect to the former, of the absence of any turbidity zone and, with respect to the latter, of an increased inhibition of the so-called crystalline nucleation.

This widened propriety range allows the use of the compounds, in the meaning according to the present invention, in many fields such as, for purely illustrative purposes, the paper industry, the fields of paints and varnishes, fillers for synthetic resins and rubbers, detergent formulations, ceramic materials, fluidisers and, more generally, for applications in civil engineering and industrial constructions.

The use of the polyaminomethylenephosphonates having formula 1 as dispersing agent, according to the present invention, is effected by adding polyaminomethylenephosphonate (PAF) to the composition of interest, in substitution of or in addition to the traditional compound used for the same purpose, at a concentration, expressed as a quantity of polyaminomethylenephosphonate (PAF), equal to or higher than 0.01% by weight with respect to the total weight of the composition, preferably ranging from 0.05 to 10% by weight: the presence of polyaminomethylenephosphonate (PAF) alone allows the use of the consequent composition without any of the previously mentioned drawbacks, or, in the case of the contemporaneous presence of one or more traditional compounds, a decrease in the unfavourable effects of the latter with a synergic enhancement in the overall performances.

The selection of the type of polyaminomethylenephosphonate (PAF), its use alone or in addition to the traditional products and the procedure for using it, will obviously be up to the expert in the field who, on the basis of his experience, will try, each time, to find the most suitable solution.

Again for purely illustrative purposes, some indications will be provided hereunder, relating to the embodiment according to the present invention, in particular fields and for specific objectives, from which extrapolations and extensions, formula exchanges and adaptations to particular cases, are obviously possible, still remaining within the definition and objectives of the present invention, according to what has been previously described and is subsequently claimed. The data provided hereunder have been obtained from practical embodiments of the invention and are considered as being highly significant as far as a projection of practical use of the invention is concerned.

With reference, therefore, to the use of polyaminomethylenephosphonates (PAF) having formula 1 as super-plasticizers for cement material, the fluidity of the mixture is improved as well as the processability of the cement itself. The above-mentioned phosphonates exert their dispersing properties both when used as such and when used with other superplasticizers, for example of the polycarboxylic-polyethers (PCE) type: in this case, the influence of the type of cement on the PCE efficacy is attenuated, and the retention time of the fluidity is extended. At the same time, no negative influences are observed on the concrete or on the cement paste, neither is there any delay in the setting and hardening.

Among the compounds having formula 1, those which appear to be more suitable for being used as super-plasticizers in the cement field, have n ranging from 2 to 50, preferably from 2 to 10, and R is selected from —$CH_2PO_3M_2$ and —$CH_2CH_2OH$, with a ratio between the two groups ranging from 10 to 0.01, preferably from 5 to 0.1.

The following experiments were effected on mortars according to the European standard EN 1015-3.

EXAMPLE 1

A mortar is prepared according to the mixing procedure of the standard European regulation EN 196-1, with:

| | |
|---|---|
| cement CEM 1 52.5 R | 450 g |
| standard sand according to EN 196-1 | 1350 g |
| deionised water | 225 g |

EXAMPLE 2

A mortar is prepared according to the above standard European mixing procedure, with:

| | |
|---|---|
| cement CEM 1 52.5 R | 450 g |
| standard sand according to EN 196-1 | 1350 g |
| deionised water | 225 g |
| PCE | 0.45 g (dry matter) |

EXAMPLE 3

A mortar is prepared according to the above standard European mixing procedure, with:

| | |
|---|---|
| cement CEM 1 59.5 R | 450 g |
| standard sand according to EN 196-1 | 1350 g |
| deionised water | 225 g |
| PAF | 0.68 g (dry matter) |

EXAMPLE 4

A mortar is prepared according to the above standard European mixing procedure, with:

| | |
|---|---|
| cement CEM 1 52.5 R | 450 g |
| standard sand according to EN 196-1 | 1350 g |
| deionised water | 225 g |
| PCE | 0.40 g (dry matter) |
| PAF | 0.05 g (dry matter) |

Results: Paste Flow in mm

EXAMPLES

| | Results: crushing resistance of 1.MPC | | | |
|---|---|---|---|---|
| Time (m) | 1 | 2 | 3 | 4 |
| 0 | 110 | 280 | 275 | 280 |
| 30 | 100 | 275 | 270 | 280 |
| 60 | 100 | 250 | 270 | 280 |
| 90 | 100 | 220 | 265 | 275 |

EXAMPLES

| Time (hr) | 1 | 2 | 3 | 4 |
|---|---|---|---|---|
| 16 | 13 | 12 | 8 | 12 |
| 24 | 24 | 22 | 23 | 23 |
| 7 | 49 | 41 | 50 | 45 |

The polyaminomethylenephosphonates (PAF) having formula 1 are dispersants and stabilizers for suspensions of ceramic material and ceramic glass. They can advantageously substitute dispersing polymers normally used, such as, for example, polymers of the carboxylic, sulphonic or phosphonic type, copolymers containing these functional groups or blends thereof.

Traditional ceramic products for sanitary fixtures, kitchen articles, porcelains for electrical applications and also special materials for structural, electronic and medical applications, are considered ceramic materials. They are normally produced by melting, extrusion or spray drying. In the above uses, the amount of PAF ranges from 0.01 to 10% by weight with respect to the weight of the ceramic material.

Furthermore, amorphous dispersions of ceramic materials are used in numerous applications such as, for example, catalysis, pigments, optical devices, etc . . . ; with the use of PAF these devices can be made extremely stable, starting from suspensions of the most different crystalline products.

EXAMPLE 5

Mix of Clay/water for the Production of Sanitary Fixtures by Casting

A stable mix can be produced according to the following formulation: 65% (as total weight) of ceramist clay and 0.5% of PAF (as raw material). The clay has a particle size distribution for 35% <0.5 μm, 55% <2 μm and 75% <5 μm. The clay contains about 55% of silica and 22% of alumina. The initial Brookfield viscosity of the blend, at 100 gm rpm, is equal to about 300 mPa*s, and has a gel viscosity, at 0.5 rpm, of 2000 mPa*s, 5000 mPa*s, 6000 mPa*s at 5, 10 and 20 minutes. The gel viscosity at 20 minutes, at 0.5 rpm, of a blend prepared three days before, is 8,000 mPa*s. The blend has an assessment index (ratio between the solid content of the upper and lower layers) of 0.95.

EXAMPLE 6

Ceramic Glass

A sanitary ceramic glass with improved drying and splattering properties contains a PAF derivative at a dosage of 0.3% of active matter (in total weight), 65% of base ceramic material and 0.2% of hydrophobically modified hydroxyethylcellulose. The glass has a flow viscosity of 9,500 mPa*s at a shear factor of 10 $sec^{-1}$ and a viscosity of 870 mPa*s at a shear factor of 100 $sec^{-1}$.

EXAMPLE 7

Dispersions of Silicon Carbide Whiskers

Stable dispersions of silicon carbide whiskers are prepared by adding 2 g of silicon carbide whiskers to a water solution and dispersing agent, and mixing in a Waring mixer, at a low rate, for 15 seconds. The dispersing agent is the sodium salt of polyacrylic acid (PAA) 0.08 g of active matter, as well as the PAF derivative 0.05 g of active matter. Immediately after the mixing, 500 ml of the suspension are poured into a 25 mm graduated cylinder. The cylinder is closed and left to rest. The sediment level is recorded at regular intervals.

The results are shown in the following table.

| Dispersing agent | Sedimentation levels as mm. Time | | | |
|---|---|---|---|---|
| | 5 m | 15 m | 1 hr | 2 hr |
| PAF | <1 | <1 | 1 | 1 |
| PAA | 20 | 14 | 10 | 10 |

EXAMPLE 8

Preparation of an Amorphous Colloid

A stabilized colloid is prepared by the mixing and nucleation of 12.2 g/l of $Cu(NO_3)_2 \cdot 3H_2O$, 12.2 g/l of gelatine and sodium hydroxide in a double quantity with respect to the molar concentration of the copper ions. Before the thermal aging, the pH is brought to 9.0 and the blend is kept for about 16 hours at a temperature ranging from about 75° C. to about 80° C.

An amount of the suspension (a) is diluted 4 times with water, and another amount (b) is diluted 4 times with 5 g/l of PAF derivative.

The examination of the dispersions by means of an electronic transmission microscope, comparing (a) and (b) through their respective diffraction patterns, revealed the following main characteristics.

Dispersion (a) produces needle-shaped particles with a particle length estimated at between 150 and 200 Å.

Dispersion (b), on the contrary, is a finely divided matter with a particle size lower than 20 Å. It can be observed that, by adding the PAF derivative, the dispersion is modified to the more accentuated amorphous nature of the colloidal particles. When using the dispersion (b), in comparison with (a), in a plating process without electrolysis, (b) proved to be more active than (a).

The use of PAF, according to the present invention, can also have the purpose of preventing the precipitation of the metal ions dissolved in the treatment of industrial water, and great improvements have been observed by treating water containing Ca, Mg, Ba, Cu, Fe, Mn and Zr ions, by adding PAF derivatives to the aqueous system of interest, in quantities ranging from 1 to 10,000 ppm.

It is therefore possible to treat systems in boilers, heat exchangers, desalination equipment, through evaporative distillation or reverse osmosis, mining circuits for the recovery of metals or metal minerals, geothermal wells for energy production and systems used in the petroleum field. Particular advantages are obtained in flash distillation, application in the petroleum field, ore-pulp digesters, the production of phosphoric acid, evaporators.

EXAMPLE 9

Reverse Osmosis

Interest in water purification by reverse osmosis (RO) is continuously increasing. In particular, it is used in the desalination of marine water, in the production of drinking water, in cooling towers, in the treatment of process water, etc.

The RO process consists in sending water, under pressure, through a semi-permeable membrane. Whereas pure water (permeate) passes through the membrane layer, the residual water (retained) is enriched with contaminants.

An operative cost factor of the reverse osmosis system is represented by the cost of the membrane itself, which must be substituted. There are several types of crusting inhibitors which are currently in use, for example:

sodium hexametaphosphate (SHMP);

copolymer of an acrylic acid and an alkyl ester (MS 4.762.621);

homopolymer of maleic acid or copolymers of mono-unsaturated acids, monocarboxylic or dicarboxylic acids and salts thereof (MS 4.784.774);

phosphonates (MS 5.000.856).

The use of PAF according to the invention produces a high inhibition efficiency of the formation of deposits on the $CaCO_3$ and $CaSO_4$ membrane and in the dispersion of iron. Reverse osmosis tests have been carried out in this respect, using several inhibitors:

terpolymers of acrylic acid, acrylamide, acrylamidomethyl-sulphonic acid (Terpolymer);

phosphonate such as hexapotassium salt of hexamethylene-bis(nitrilodimethylene)-tetraphosphonic acid Trade-name Sequion 50 K 33;

PAF derivative.

The tests were effected under a pH of 7.00 and dosages of 5 to 300 ppm of Ca (as $CaCO_3$), 260 ppm of Mg (as $MgCO_3$), 10 ppm of Fe, T of 60° C. over a period of 24 hrs, filtering on 0.22 microns. The crusting and deposit inhibition property is expressed as inhibition % (% I) calculated according to $$\%I = \frac{\text{final\%} - \%\text{final white}}{\text{initial\%} - \%\text{final white}}$$

The details are shown in the following table:

| Nr | Terpolymer (ppm) | Sequion 50 K 33 (ppm) | PAF (ppm) | I % | Dispersed Fe % |
|---|---|---|---|---|---|
| 0   | 0.00  | 0.00 | 0.00 | 0   | 1     |
| 1.a | 1.14  | 0.00 | 0.00 | 11  | 4.7   |
| 1.b | 4.00  | 0.00 | 0.00 | 97  | 10.4  |
| 1.c | 10.00 | 0.00 | 0.00 | 95  | 96.6  |
| 2.a | 0.00  | 0.6  | 0.00 | 10  | 0.5   |
| 2.b | 0.00  | 0.90 | 0.00 | 101 | 1.1   |
| 2.c | 0.00  | 4.00 | 0.00 | 111 | 2.1   |
| 3.a | 0.00  | 0.00 | 0.1  | 46  | 1.0   |
| 3.b | 0.00  | 0.00 | 0.2  | 75  | 26    |
| 3.c | 0.00  | 0.00 | 0.4  | 98  | 92.9  |
| 3.d | 0.00  | 0.00 | 0.8  | 113 | 100.0 |

EXAMPLE 10

Scaling Inhibition in Underground Oil Reservoir

The scaling produced by the deposit of solid salts from over-saturated brine solutions injected in or removed from underground oil deposits causes a production decrease. Said deposits can block the reservoir porosity and stop drilling, piping, safety valves and other drilling devices. Crusting of different organic or inorganic origins causes problems during production: usual inorganic scales are calcium carbonate, calcium, barium strontium sulphate, calcium salts above all. Scaling can be removed or inhibited, inhibition being the most widely-used method. One of the most efficient chemical treatment methods consists in the use of a product having a threshold effect, i.e. a product which inhibits precipitation at a concentration well below equimolecular quantities, normally concentrations of a thousandth of the scaling material.

The most common classes of chemical inhibitors are inorganic phosphates, organo phosphonic compounds (phosphonates) and organic polymers; in particular, phosphonates and organic polymers are more stable to heat than inorganic phosphates.

Compounds that can be used according to the invention are derivatives of polyaminomethylenephosphonates according to formula 1. The type of compound to be used and the relative amount is selected according to the treatment to be effected (deposit conditions, brine type, well conditions, etc . . . ) typical dosages are in the range of 0.1% -10 ppm. In addition to the treatment of crusting due to calcium salts, the use of PAF is particularly advantageous in the reduction of the presence of barium compounds, for which the products currently on the market do not appear to be particularly efficient.

In the experimental details the following definitions will be used:

| | |
|---|---|
| Inhibitor A | PAF derivative |
| Inhibitor B | HEDP = hydroxyethylidene diphosphonic acid sold as Sequion 10H60 by the Applicant. |
| Inhibitor C | Rohm & Haas 980 = copolymer of methacrylic and acrylic acid. |

The evaluations were effected by means of static inhibition tests, for $CaCO_3$, $CaSO_4$ and $BaSO_4$.

| $CaCO_3$ | | | |
|---|---|---|---|
| 1. Bath temperature (38° C. to 95° C.) | | | |
| 2. Glass cell with screw closing | | | |
| 3. Synthetic brine | Solution A | 12.16 g/l | $CaCl_2H_2O$ |
| | | 3.68 g/l | $MgCl_26H_2O$ |
| | | 33.0 g/l | NaCl |
| | Solution B | 7.36 g/l | $NaHCO_3$ |
| | | 29.4 g/l | $Na_2SO_4$ |
| | | 33.0 g/l | NaCl |
| 4. Graduated cylinders | | 50 ml | |
| 5. Suitable inhibitor solutions | | 0.1%-5% | |
| 6. Pipettes | | 10 ml | |
| 7. 150 ml Erlenmeyer containers for each inhibitor | | | |
| 8. Standard EDTA solution. | | | |

In the experiments, the solutions A and B were mixed in the presence of the inhibitor and, for control purposes, each test was effected also without the inhibitor.

The amount of precipitate formed at pre-established times can be determined by the analysis of a small portion of aqueous solution, in order to measure the concentration of one of the soluble compounds. By means of the known titration methods, if a precipitate is formed in a solution containing a PAF derivative, and if the solution does not contain more concentration of non-inhibited product, the inhibition value is 0%; if a precipitate is not formed, and the solution contains all the original cationic concentration, the test determines a 100% inhibition.

| $CaCO_3$ results (inhibition % at different concentrations of inhibitors) | | |
|---|---|---|
| Inhibitor | 1 ppm | 3 ppm |
| A | 70 | 100 |
| B | 58 | 80 |
| C | 45 | 75 |

| $CaSO_4$ results | | | | |
|---|---|---|---|---|
| A different brine is used | Solution A | 7.5 g/l | NaCl | |
| | | 11.1 g/l | $CaCl_2H_2O$ | |
| | Solution B | 7.5 g/l | NaCl | |
| | | 10.66 g/l | $Na_2SO_4$ | |
| Inhibitor | 0.1 ppm | 0.3 ppm | 0.5 ppm | 1 ppm |
| A | 67 | 100 | — | — |
| B | 49 | 77 | 100 | — |
| C | 38 | 59 | 95 | 100 |

In both cases, inhibitor A is more efficient at low concentrations. B and C are valid at increasing concentrations, at which A was not tested.

$BaSO_4$ Results

The conditions are the same, except for the brine which has the following concentration:

| | | | | |
|---|---|---|---|---|
| Solution A | 42 g of marine water dissolved in distilled water, up to 1 liter | | | |
| Solution B | 25 g of NaCl analytical grade and 0.0456 g of $BaCl_2 \cdot 2H_2O$ analytical grade dissolved in distilled water, up to 1 liter | | | |
| Solution C | 50 g of $NaHCO_3$ analytical grade dissolved in distilled water, up to 1 liter | | | |

| Inhibitor | 1 ppm | 3 ppm | 5 ppm | 10 ppm |
|---|---|---|---|---|
| A | 67 | 100 | — | — |
| B | 49 | 77 | 100 | — |
| C | 38 | 59 | 95 | 100 |

Also in this case, a 100% inhibition is reached, in B and C, only at a high concentration of inhibitor.

The PAF derivatives of formula 1 are used in the field of cellulose and textile materials for increasing and stabilizing the whitening effect of the hydrogen peroxide. This is used for the whitening of cellulose materials (for example wood pulp) and fabrics, but the efficacy of the treatment is obtained by the decomposition of the peroxide effected by transition metal ions such as Fe and Mn, present in cellulose or in water; PAF derivatives can act as stabilizers.

EXAMPLE 11

Wood pulp having a consistency of 24% and containing 4 ppm of Fe, 47 ppm of Mn, less than 6 ppm (in whole) of Cu, Ni, Co and 47 ppm of Mg, is subjected to whitening.

The pulp is diluted with the whitening to give a product having a consistency equal to 15% and containing 2.5 ppm of Fe, 29 ppm of Mn, less than 4 ppm of Cu, Ni, Co, 163 ppm of Ca and 29 ppm of Mg. The whitening contains 0.8% of PAF and different proportions of amino-organic phosphonic acid DTPMPA and phosphonic acid, and 2% $H_2O_2$ (total weight $H_2O_2$ with respect to the dry pulp weight), and NCOH so that the initial pH of the whitening medium is between 10 and 10.8 at 60° C. for 2 hours.

The results are the following

| | Stabilizer | | | Whitening medium | | | |
|---|---|---|---|---|---|---|---|
| Test | DTPMPA % | Phosphonic acid % | PAF % | DTPMPA % | Phosphonic acid % | PAF % | Reflectance °ISO |
| Blank | | | | | | | 53.9 |
| 1 | 45 | | | 0.36 | | | 64.1 |
| 2 | 28.1 | | | 0.22 | | | 63.2 |
| 3 | | 66 | | | 0.53 | | 65.1 |
| 4 | 9 | 50 | 28 | 0.47 | | | 66.3 |
| 5 | 9 | 33 | 14 | 0.34 | | | 64.8 |
| 6 | 4.5 | 49 | | 0.43 | | | 64.1 |
| 7 | 4.5 | 33 | | 0.3 | | | 63.8 |
| 8 | | | 28 | | | 0.2 | 80.2 |
| 9 | | | 14 | | | 0.1 | 73.9 |

PAF derivatives having formula 1 can substitute phosphates in a detergent composition for fabrics. Phosphates, such as sodium tripolyphosphate, have been used for many years as components in formulations for fabric washing.

For some time, however, the quantities of phosphates have been reduced due to environmental pollution, and the R&D is oriented towards substitutive "builders". PAF derivatives can be used as adjuvants of the new systems of "builders". PAF are preferably used as sodium salts, at concentrations of at least 0.5% and preferably not higher than 5%. Concentrations and conditions of use are those adopted in tests for IEC cleaning.

EXAMPLE 12

Detergent compositions containing PAF were evaluated using special standard commercial strips (EMPA) measuring 12×12 cm, sewn onto cotton fabrics of 1 m×1 m and washed at 60° C. The washing machine is a Candy Eclipsa, with 25 liters of washing water. At the end of the washing cycle, the fabrics are dried. The washing efficiency is evaluated by measuring the white degree on the strips, defined by the reflection of blue light (460 mm). The reflectance of both sides of the strip is measured and an average value is calculated.

Experimental Conditions:

| | |
|---|---|
| washing time | 2 hours |
| washing temperature | 60° C. |
| hardness | 400 ppm $CaCO_3$ |
| detergence tests | reference IEC type A "no phosphates" |
| | reference IEC type B "with phosphates" |
| dosages | the mix is preferably added to the entering water, as g/l, depending on the water hardness. In the cases under examination 7.5 g/l of detergent are added. |

The following powders were used:

| | |
|---|---|
| A | IEC type B |
| B | IEC type A plus 1% PAF |
| C | IEC type A plus 2.5% PAF |
| D | IEC type A plus 5% PAF |

The following average reflectance values were obtained

| Composition | A | B | C | D |
|---|---|---|---|---|
| EMPA 101 | 82 | 76 | 86 | 90 |
| EMPA 104 | 54 | 55 | 60 | 64 |

EMPA 101 = cotton stained with perfume and olive oil.
EMPA 104 = polyester/cotton 65/35 stained with perfume and olive oil.

EXAMPLE 13

Use of PAF as dispersing-wetting agent in dyeing products based on lime and silicates. Experiments are described hereunder in which PAF is used in systems for the preparation of dyeing products based on inorganic binders such as lime and silicates. Tests were performed both in water solution (in order to avoid the interference of possible agents), and on complete paints based on lime and silicates, to evaluate the above-mentioned systems.

In order to make the evaluations on the behaviour of the systems under examination more significant, PAF is compared with other dispersing-wetting agents already widely used on the market, identified as (Wetting 1+dispersing agent) and (Wetting 2+dispersing agent).

The laboratory tests performed were:

On water solutions
    surface tension with the ring method at a constant temperature of T=25±1° C.

On paints based on lime and silicates

1. Brookfield rotational viscosity measurements (after conditioning in an oven at T=50±2° C. and after being preserved in a climatic chamber at T=23±2° C., and UR=50±5%.

These conditions simulate the storage of paints in a warehouse during a middle season;
2. surface tension measurements at a constant temperature of T=25±1° C. with the ring method;
3. sedimentation measurements effected by means of a dynamometer;
4. calorimetric measurements of chromatic variations (delta E) and yield
5. rub-out tests.

Preparation of the Water Solutions and Paints

Preparation of the Water Solutions

Water solutions of the wetting/dispersing systems at concentrations of 0.2%, 0.5%, 0.8% and 1.2% were prepared in order to effect surface tension measurements.

Preparation of Paints.

White and pigmented lime-based paints were prepared together with white and pigmented silicate-based paints.

The formulations used are the following:

| WHITE LIME PAINTS | |
|---|---|
| Component | Amount |
| Pre-mixing: | |
| Water | necessary for 100 |
| softener | 0.100-0.400 |
| thickener | 0.400-1.000 |
| wetting 1 + dispersing agent/ wetting 2 + dispersing agent/PAF | 0.200 |
| Glycol | 0.200-0.600 |
| Antifoaming agent | 0.100-0.850 |
| Wait 15' | |
| Add slowly under stirring: | |
| $TiO_2$ (white pigment) | 1.000-5.000 |
| $CaCO_3$ | 20.000-35.000 |
| Lime solution ** | 25.000-45.000 |
| Organic resin solution | 2.000-10.000 |

| COLOURED LIME PAINTS | |
|---|---|
| Component | Amount |
| Pre-mixing: | |
| Water | necessary for 100 |
| softener | 0.100-0.400 |
| thickener | 0.400-1.000 |
| wetting 1 + dispersing agent/wetting 2 + dispersing agent/PAF | 0.200 |
| Glycol | 0.200-0.600 |
| Antifoaming agent | 0.100-0.850 |
| Wait 15' | |
| Add slowly under stirring: | |
| $TiO_2$ (white pigment) | 1.000-5.000 |
| $CaCO_3$ | 20.000-35.000 |
| Lime solution ** | 25.000-45.000 |
| Organic resin solution | 2.000-10.000 |
| red pigment | 1.000-5.000 |
| yellow pigment | 1.000-5.000 |

| WHITE SILICATE PAINTS | |
|---|---|
| Component | Amount |
| Pre-mixing: | |
| Water | necessary for 100 |
| thickener | 0.300-0.780 |
| wetting 1 + dispersing agent/wetting 2 + dispersing agent/PAF | 0.200 |
| additive for silicates | 0.600-1.400 |
| Antifoaming agent | 0.050-0.150 |
| Wait 15' | |
| Add slowly under stirring: | |
| $TiO_2$ (white pigment) | 10.000-23.000 |
| $CaCO_3$ | 20.000-40.000 |
| mica F | 1.000-5.000 |
| organic resin | 3.000-8.000 |
| coalescent | 0.100-0.400 |
| Antifoaming agent | 0.010-0.050 |
| silicate binder | 5.00-30.000 |

| COLOURED SILICATE PAINTS | |
|---|---|
| Component | Amount |
| Pre-mixing: | |
| Water | necessary for 100 |
| thickener | 0.300-0.780 |
| wetting 1 + dispersing agent/wetting 2 + dispersing agent/PAF | 0.200 |
| additive for silicates | 0.600-1.400 |
| Antifoaming agent | 0.050-0.150 |
| Wait 15' | |
| Add slowly under stirring: | |
| $TiO_2$ (white pigment) | 10.000-23.000 |
| $CaCO_3$ | 20.000-40.000 |
| mica F | 1.000-5.000 |
| organic resin | 3.000-8.000 |
| coalescent | 0.100-0.400 |
| Antifoaming agent | 0.010-0.050 |
| silicate binder | 5.00-30.000 |
| red pigment | 1.000-5.000 |
| yellow pigment | 1.000-5.000 |

White paints were prepared, containing only $TiO_2$ as pigment, as well as coloured paints containing two iron oxides as pigments, in order to evaluate the behaviour of the wetting/dispersing systems with respect to these pigments which, in addition to being widely used for preparing paints based on lime and silicates, have rather a high oil and water absorption. This allows the efficacy of the wetting/dispersing systems to be verified under particularly critical operating conditions.

Surface Tension Measurements

Measurements of the surface tension of the wetting/dispersing systems in water solution are useful for understanding their behaviour in water when other components which can cause interferences are not present. Through these measurements, it is possible to establish the capacity of the wetting/dispersing systems to reduce the surface tension of the liquid (water) and their distribution both at the liquid/air interface and inside the solution.

Tables and graphics relating to the surface tensions of water solutions of the wetting/dispersing systems at different percentages of use, are provided hereunder.

The PAF solution always develops surface tensions higher than Wetting 1, Wetting 2 and dispersing agent, this is due to:
a) there is a lower concentration at the liquid/air interface and it remains more easily in solution;
b) it has a different intrinsic capacity of lowering the surface tension.

These behaviours are correlated with the different chemical nature of PAF with respect to the traditional products.

Lime and Silicate Paints

Viscosity Measurements

The viscosity measurements on the painting products based on lime and silicates allow the efficacy of the wetting/dispersing systems under examination to be evaluated, both over a short period (immediately after the dispersion preparation) and over a long period (warehouse storage).

A good wetting/dispersing system must be capable of maintaining, with time, the viscosity of an inorganic paint at values of 20,000-30,000 cps, i.e. at a viscosity degree which allows the mixing and application of the product without creating excessive swellings and thickenings.

Viscosity After Preservation in a Climatic Chamber.

viscosity measurements are provided hereunder, as a function of time, obtained on paints kept in climatic chambers at T=23±2° C. and UR 50±5% during the time indicated in the graphs and tables. The measurements are effected at the same temperature (operative conditions: rate 20; rods 5, 6, 7).

| WHITE LIME | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 8750 | 4 | 11500 | 4 | 10000 | 4 |
| 12500 | 7 | 15700 | 7 | 10500 | 7 |
| 13500 | 13 | 16000 | 13 | 12000 | 13 |
| 13000 | 18 | 15000 | 18 | 13500 | 18 |
| 13500 | 21 | 14500 | 21 | 14000 | 21 |

| RED LIME | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 19500 | 3 | 13000 | 3 | 13000 | 0 |
| 26000 | 6 | 22000 | 6 | 17500 | 3 |
| 29000 | 12 | 27000 | 12 | 22500 | 9 |
| 29000 | 17 | 29000 | 17 | 22500 | 14 |
| 27000 | 20 | 28000 | 20 | 23500 | 17 |

| WHITE SILICATES | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 5700 | 5 | 5700 | 5 | 7300 | 4 |
| 21000 | 11 | 18500 | 11 | 31000 | 10 |
| 25500 | 14 | 25750 | 14 | 38500 | 13 |
| 33500 | 20 | 36000 | 20 | 39000 | 19 |
| 35000 | 25 | 39750 | 25 | 40000 | 24 |
| 37500 | 28 | 39500 | 28 | 41500 | 27 |

| RED SILICATES | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 6600 | 1 | 6100 | 0 | 6800 | 0 |
| 17500 | 7 | 18250 | 6 | 23500 | 6 |
| 24000 | 10 | 22000 | 9 | 28000 | 9 |
| 28500 | 16 | 25000 | 15 | 32500 | 15 |
| 29000 | 21 | 28500 | 20 | 35000 | 20 |
| 28000 | 24 | 27500 | 23 | 36500 | 23 |
| 60000 | 81 | 86000 | 80 | 64000 | 80 |

Viscosity After Treatment in an Oven.

The viscosity measurements in relation to the time are indicated below, for paints kept in an oven at T=50±2° C. for the time mentioned in the graphs and tables. The measurements are effected at T=23±2° C. and UR 50±5% (operative conditions: rate 20; rods 6 and 7)

| WHITE LIME | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 8750 | 4 | 11500 | 4 | 10000 | 4 |
| 16000 | 7 | 21000 | 7 | 20500 | 7 |
| 14000 | 13 | 19000 | 13 | 17500 | 13 |
| 15000 | 18 | 20000 | 18 | 19500 | 18 |
| 13500 | 21 | 16000 | 21 | 17250 | 21 |

| RED LIME | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 19500 | 3 | 13000 | 3 | 13000 | 0 |
| 38000 | 6 | 30000 | 6 | 32000 | 3 |
| 39000 | 12 | 40000 | 12 | 41000 | 9 |
| 32000 | 17 | 36000 | 17 | 38000 | 14 |
| 30000 | 20 | 34000 | 20 | 40000 | 17 |

| WHITE SILICATES | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 14750 | 6 | 14250 | 6 | 18000 | 5 |
| 15500 | 8 | 15750 | 8 | 23000 | 7 |
| 48000 | 11 | 46000 | 11 | 46000 | 10 |
| 56000 | 20 | 62000 | 20 | 60000 | 19 |
| 50000 | 23 | 46000 | 23 | 56000 | 22 |
| 44000 | 25 | 44000 | 25 | 50000 | 24 |
| 40000 | 28 | 41000 | 28 | 45000 | 27 |

| RED SILICATES | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 16500 | 2 | 15000 | 1 | 16750 | 1 |
| 18000 | 4 | 16750 | 3 | 18000 | 3 |
| 42000 | 7 | 42000 | 6 | 53000 | 6 |
| 51000 | 10 | 56000 | 9 | 63000 | 9 |
| 50000 | 16 | 52000 | 15 | 56000 | 15 |
| 50000 | 21 | 48000 | 20 | 52000 | 20 |
| 44000 | 24 | 47000 | 23 | 48000 | 23 |

Lime-based Paints

Polyaminomethylenephosphonate derivatives allow easily processable paints to be obtained (the viscosity value is always around 11,000 cps for white products and about 22,000 cps for coloured products) which remain constant with time. This means that the product does not create problems relating to processability and applicability even after a long storage time.

PAF products, with respect to the TRADITIONAL PRODUCTS maintain lower viscosity values for coloured products and therefore better conditions for use.

Conditioning in an oven at T=50±2° C. does not show particular differences for all the wetting/dispersing systems examined, either for white lime products or for coloured lime products.

Silicate-based Paints

The viscosities developed by PAF in white and red silicate-based paints, during the first 15 days, are slightly lower than those developed by TRADITIONAL PRODUCTS. After this period, the viscosities of white silicate-based paints maintain a value which is such as to allow a good processability, above all for white paints.

Conditioning in an oven at T=50±2° C. does not show particular differences for all the wetting/dispersing systems examined, for white silicate products and for coloured silicate products.

A further viscosity measurement was effected about 80 days after the preparation, in order to control the behaviour of the paints over a longer time period. The results were the following:

| WHITE LIME | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 12750 | 78 | 12250 | 78 | 10250 | 78 |

| RED LIME | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 30000 | 77 | 35000 | 77 | 27000 | 74 |

| WHITE SILICATES | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 84000 | 85 | 56000 | 85 | 40000 | 84 |

| RED SILICATES | | | | | |
|---|---|---|---|---|---|
| Wetting 1 + dispersing agent | | Wetting 2 + dispersing agent | | PAF | |
| Viscosity | Days | Viscosity | Days | Viscosity | Days |
| 60000 | 81 | 86000 | 80 | 44000 | 80 |

Surface Tension Measurements

Surface tension measurements on the paints are useful for understanding the behaviour of the wetting/dispersing systems and therefore for evaluating their affinity with respect to pigments.

| WHITE LIME Wetting 1 + dispersing agent | | RED LIME Wetting 1 + dispersing agent | | WHITE SILICATES Wetting 1 + dispersing agent | | RED SILICATES Wetting 1 + dispersing agent | |
|---|---|---|---|---|---|---|---|
| Time (s) | Surf. tens. (mN/m) | Time (s) | Surf. tens. (mN/m) | Time (s) | Surf. tens. (mN/m) | Time (s) | Surf. tens. (mN/m) |
| 85.2 | 39.30 | 82.1 | 38.94 | 64.8 | 33.30 | 85.8 | 38.99 |
| 184.5 | 39.10 | 184.1 | 38.70 | 175.9 | 33.13 | 185.9 | 38.81 |
| 285.4 | 38.90 | 285.5 | 38.59 | 267.9 | 33.13 | 285.9 | 38.70 |
| 385.4 | 38.90 | 386.9 | 38.52 | 360.7 | 33.11 | 385.7 | 38.65 |

-continued

| Wetting 2 + dispersing agent | | Wetting 2 + dispersing agent | | Wetting 2 + dispersing agent | | Wetting 2 + dispersing agent | |
|---|---|---|---|---|---|---|---|
| Time (s) | Surf. tens. (mN/m) | Time (s) | Surf. tens. (mN/m) | Time (s) | Surf. tens. (mN/m) | Time (s) | Surf. tens. (mN/m) |
| 85.6 | 39.10 | 83.4 | 39.50 | 83.4 | 38.88 | 85.9 | 40.64 |
| 184.6 | 39.03 | 181.6 | 39.40 | 181.4 | 38.69 | 184.7 | 40.43 |
| 282.8 | 38.97 | 282.0 | 39.34 | 277.5 | 38.57 | 282.3 | 40.30 |
| 382.2 | 38.92 | 382.1 | 39.31 | 371.1 | 38.42 | 380.2 | 40.22 |
| PAF | | PAF | | PAF | | PAF | |
| Time (s) | Surf. tens. (mN/m) | Time (s) | Surf. tens. (mN/m) | Time (s) | Surf. tens. (mN/m) | Time (s) | Surf. tens. (mN/m) |
| 89.6 | 43.71 | 83.3 | 43.65 | 84.2 | 42.32 | 66.6 | 40.82 |
| 193.6 | 43.65 | 182.4 | 43.61 | 184.6 | 42.07 | 181.1 | 40.68 |
| 295.9 | 43.62 | 284.2 | 43.57 | 283.2 | 41.97 | 262.0 | 40.67 |
| 399.0 | 43.59 | 383.0 | 43.58 | 380.8 | 41.89 | 376.6 | 40.62 |

Lime-based Paints

White lime paints, formulated with PAF, give surface tensions which are always higher than those formulated with TRADITIONAL PRODUCTS. This means that as the wetting/dispersing systems concentrate less on the liquid/air interface, they remain more easily in the mixing, thus favouring the dispersion of titanium dioxide. This is confirmed by comparing the viscosity data, as a more fluid product indicates that the wetting/dispersing system is more efficient in the dispersion action of solids: fillers and pigments. The viscosity measurement relating to the products conditioned at T=23±2° C. and UR=50±5%, for 20 days, agree with the surface tension data, as the viscosities developed by PAF are lower with respect to those developed by TRADITIONAL PRODUCTS.

In coloured lime paints the same behaviour was observed as in the white paints, even if, in this case, the viscosity difference between PAF and the TRADITIONAL PRODUCTS is more marked. This is due to the presence of coloured pigments which necessitate a higher dispersion with respect to the titanium dioxide.

Chromatic Variation Measurements

The yield of a sample indicates the development of colour with respect to a standard. It indicates the colouring strength of the painting system. ΔE was used as a comparison parameter for the chromatic variations, defined as:

$$\Delta E = (\Delta L^2 + \Delta a^2 + \Delta b^2)^{0.5}$$

wherein L a and b are the chromatic coordinates in the colour space CIELab.

On the basis of the value of ΔE, even a minimum colour variation, which is not visible to the human eye, can be estimated. In general, yields not lower than 95% and values of ΔE lower than 1 are acceptable. The coloured paints formulated with the wetting/dispersing system were used as reference standard. The yield and ΔE measurements of the paints formulated with PAF are shown below.

| RED LIME PAINT | | |
|---|---|---|
| | Yield | ΔE |
| PAF | 104.6% | 0.87 |

| RED SILICATE PAINT | | |
|---|---|---|
| | Yield | ΔE |
| PAF | 102% | 0.85 |

Lime-based Paints

PAF products always give higher colour yield values than those of TRADITIONAL PRODUCTS; this means that they develop the pigments analogously to each other, and with a higher efficiency with respect to the TRADITIONAL PRODUCTS; in particular, PAF products develop the maximum yield (104.6%).

Silicate-based Paints

Also in this case, PAF products give extremely good colour yield values. The calorimetric yield results confirm the improvement in performances in the paints based on silicates already observed through the viscosity measurements.

Rub-out Test

The rub-out is a rubbing-pressure test of freshly applied paint which highlights phenomena of surfacing, floating or flocculation of the pigment which can cause flaring-up phenomena.

Tests did not show colour flaring-up in any of the paints examined. This means that PAF are suitable for dispersing coloured and white pigments in lime- and silicate-based paints and are compatible with the same.

Sedimentation Measurements

Sedimentation measurements allow the tendency of the products to form a deposit during storage time in a can, to be evaluated. The measurements are effected by measuring the mass of paint which deposits on a particular area of the container, over a definite period of time. The higher the mass, the higher the tendency of the paint is towards sedimentation. Graphs are provided below, relating to coloured paints only, as these are more representative of the behaviours expressed by both lime-based and silicate-based products.

It is evident that none of the paints tend to sediment (the curves quickly reach their maximum mass values). This is definitely due to the high viscosities developed from their preparation (viscosities always higher than 8,000 cps). The differences in the values expressed by the systems under examination are completely negligible as the sedimentations vary from 0.015 to 0.08 for lime products and from 0.04 to 0.25 for silicate products.

The invention claimed is:

1. A method for increasing dispersion in a liquid solution or dispersion, the method comprising:

adding a polyaminomethylenephosphonate composition to the liquid solution or dispersion, the polyaminomethylenephosphonate composition having the formula

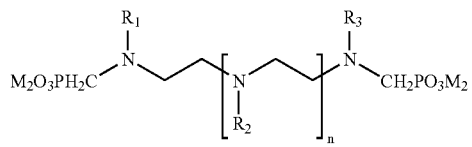

wherein n is an integer higher than 2,
wherein M is a cation selected from the group consisting of the alkaline metal ions and the ammonium ion,
wherein each of the R groups is independently selected from the group consisting of,
—$CH_2PO_3M_2$,
—$CH_2Z$, wherein Z is selected from the group consisting of —$CH_2OH$, —$CHOHCH_3$, —$CHOHCH_2Cl$, —$CHOHCH_2OH$,
—$(CH_2)_mSO_3M$, wherein m is 3 or 4,
—$CH_2CH_2T$, wherein T is selected from the group consisting of —$CONH_2$, —CHO, —COOQ, —COOX, —CN, wherein Q is —$CH_3$ or —$C_2H_5$, and wherein X is a cation selected from the group consisting of the alkaline metal ions and the ammonium ion,
wherein the polyaminomethylenephosphonate composition is added in a weight quantity higher than 0.01% of total solution or dispersion weight, and
wherein the liquid solution or dispersion further comprises a ceramic composition selected from the group consisting of clay, ceramic glass, and silicone carbide whiskers.

2. The method of claim 1, wherein the solution or dispersion is a water solution or dispersion.

3. The method of claim 1, wherein the polyaminomethylenephosphonate is added in a percentage not higher that 10% of the total solution or dispersion weight.

4. The method of claim 1, wherein the liquid solution or dispersion further comprises other dispersing additives.

* * * * *